United States Patent [19]

Grant et al.

[11] Patent Number: 5,277,443
[45] Date of Patent: Jan. 11, 1994

[54] AIR BAG DOOR WITH TEAR SEAM

[75] Inventors: Frank O. Grant, Southfield, Mich.; Joseph R. May, Chatham, N.J.

[73] Assignee: Allied-Signal Inc., Morristown, N.J.

[21] Appl. No.: 899,152

[22] Filed: Jun. 8, 1992

Related U.S. Application Data

[63] Continuation of Ser. No. 654,822, Feb. 13, 1991, abandoned.

[51] Int. Cl.[5] .............................................. B60R 21/16
[52] U.S. Cl. .................................................... 280/732
[58] Field of Search ................. 280/728, 731, 732, 743

[56] References Cited

U.S. PATENT DOCUMENTS

| | | | |
|---|---|---|---|
| 4,895,389 | 1/1990 | Pack, Jr. | 280/732 |
| 4,938,503 | 7/1990 | Muraoka et al. | 280/732 |
| 4,995,638 | 2/1991 | Shinto et al. | 280/743 |

FOREIGN PATENT DOCUMENTS 3116538  11/1982  Fed. Rep. of Germany ...... 280/732

*Primary Examiner*—Margaret A. Focarino
*Assistant Examiner*—Tamara L. Graysay
*Attorney, Agent, or Firm*—Markell Seitzman

[57] ABSTRACT

A cover (10) of integral construction for an air bag comprising: a panel (20) and a hinge (26) formed in a first side (28) of the cover (10) for enabling the panel to rotate thereabout after the panel separates from a seam on the opposite side of the panel in response to forces imparted thereto by an expanding air bag. The seam includes stress enhancing features for increasing stresses in the material causing same to tear and separate. These stress enhancing features includes a laterally extending narrow first portion (42), a closely spaced laterally extending narrow second portion (44) and a thin bridge (46) joining the first and second portions (42,44). The first portion, second portion and bridge are relatively movable one to the other so as to generate in the material at least two zones of increased tensile stress and at least two zones of increased compressive stress sufficient to cause the material to tear.

19 Claims, 2 Drawing Sheets

AIR BAG DOOR WITH TEAR SEAM

This application is a continuation of application Ser. No. 07/654,822, filed Feb. 13, 1991 now abandoned.

BACKGROUND AND SUMMARY OF THE INVENTION

This invention relates to covers, doors or enclosures for air bags.

The present invention generally relates to a door or cover to enclose and protect an air bag and more specifically to an air bag door located on the passenger side of the passenger compartment. Typically a passenger side air bag door or cover is secured to a portion of the instrument panel and is opened by inflation forces generated by the air bag. It is desirable to provide a cover or door which can be opened in response to a relatively low level of air bag deployment forces while still being structurally sound so that it will not break when pushed on by the occupant or when objects are placed upon it. It is an object of the present invention to provide an easy opening air bag door which will not impede deployment of the air bag, or deform in any manner to impact closely space parts such as the windshield. An advantage of providing a door which opens in response to a low level of airbag deployment forces is that less inertia loads are generated on a hinge portion permitting a greater latitude in the design of the hinge. While the preferred embodiment of the invention shows a passenger side air bag door the invention is not so limited. A further object of the present invention is to provide a tear seam in a door constructed of relatively rigid material.

Accordingly, the invention comprises: a cover or door, of integral construction, for an air bag comprising: a panel, hinge means formed between a first side of the cover for enabling the panel to rotate thereabout after the panel separates from a seam in response to forces imparted thereto by an expanding air bag. The seam, interposes an opposite side of the cover and the panel, and provides a tear or crack region along which the panel separates from the opposite side. The seam comprises stress enhancing means for increasing stresses in the material and includes a laterally extending narrow first portion, a closely spaced laterally extending narrow second portion and a thin bridge joining the first and second portions formed in the material forming the seam. The first portion, second portion and bridge are relatively movable one to the other so as to generate in the material at least two zones of increased tensile stress and preferably at least two zones of increased compressive stress sufficient to cause the material to tear. During the inflation of the air bag, the cover is placed in a stressed condition, causing in the preferred embodiment, the relative rotation of the first portion, bridge and second portion, stretching the material in the seam region to its ultimate elongation generally within the zones of increased tensile stress causing such material to initially separate or crack. In response to the continued inflation of the air bag, the crack laterally and rapidly propagates across the width of the seam severing the panel from the opposite side of the cover. This rapid propagation in part results from using a relatively stiff material.

Many other objects and purposes of the invention will be clear from the following detailed description of the drawings.

DETAILED DESCRIPTION OF THE DRAWINGS

Figure 1:
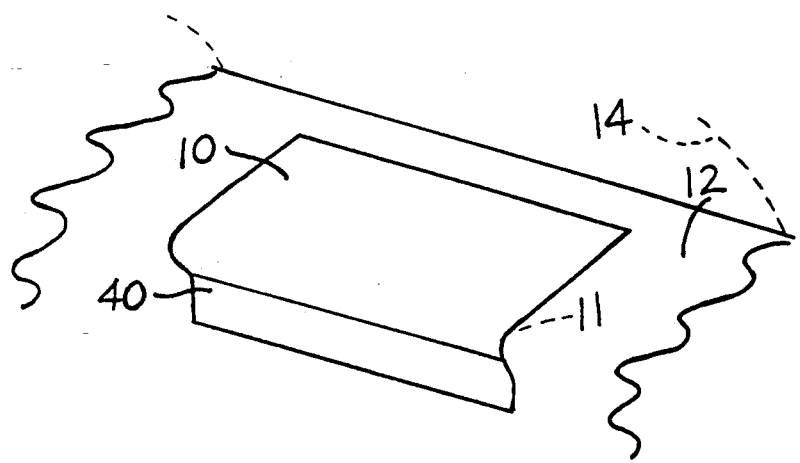
FIG. 1 illustrates a partial view of an automotive instrument panel showing a top mounted cover or door for an air bag.

FIG. 1 illustrates an air bag door or cover generally shown as 10 mounted within an opening 11 of an instrument panel 12 of a vehicle. In the embodiment shown the windshield 14 is situated forward of the instrument panel 12. This orientation is often referred to in the art as a top mount configuration.

Figure 2:
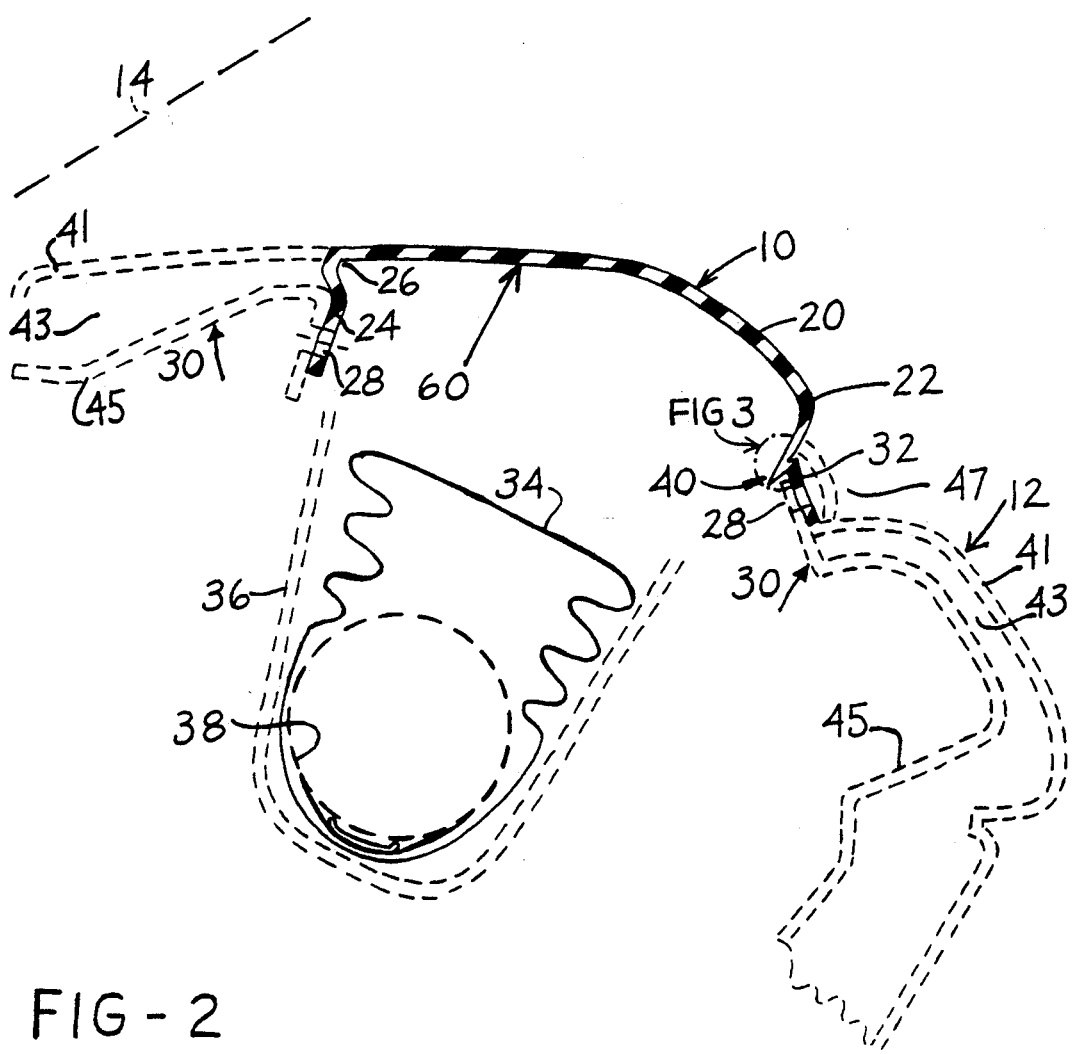
FIG. 2 illustrates a cross-sectional view showing the placement of a cover.

FIG. 2 illustrates a cross-sectional view of the cover 10. The cover 10 is integrally formed and may be injection molded using a relatively rigid material. In the illustrated embodiment a polyamide or polycaprolactam such as Nylon 6 is preferred. Plastics such as Nylon 6 have shown excellent sun loading characteristics, that is, the structural integrity of the cover 10 is not reduced due to the increased temperatures when exposed to the sun for extended periods. The effects of sunloading are important since in the preferred embodiment the cover, as well as the instrument panel 12, is subject to direct sunloads through the windshield 14. The cover 10 includes a top panel 20 which is contoured such as at 22 to conform to the contours of the instrument panel. The cover includes a side 24. The material forming the cover 10 has a reduced thickness at 26 so as to form a hinge permitting the panel 20 to rotate relative to the side 24. The side 24 may include a plurality of openings 28 for receipt of fasteners (not shown) to attach the cover 10 to a mating portion 30 of the instrument panel or to the interior vehicle structure underlaying the instrument panel in a known manner. The cover 10 further includes a passenger facing side 32 also adapted to be attached to the instrument panel 12. A specially constructed seam 40 interconnects the panel 12 with side 32.

FIG. 2 also schematically illustrates the relationship of an air bag 34 fitted within a reaction can 36 and inflated by a gas generator 38 all of known construction. These elements 34, 36 and 38 are shown in phantom line in FIG. 2. While no specific support structure is shown for the reaction can, varying methods and techniques are known within the industry and art. As mentioned above the door 10 is closely fitted to the instrument panel 12. By way of illustration the instrument panel 12 shown is of the skin-on-foam variety. More specifically the instrument panel 12 may be constructed of an outer vinyl or leather layer 41 secured to a middle foam layer 43 secured to an instrument panel retainer 45. To hide the fasteners which may secure the side 32 to the instrument panel 12, a trim molding 47 may be used.

Figure 3:
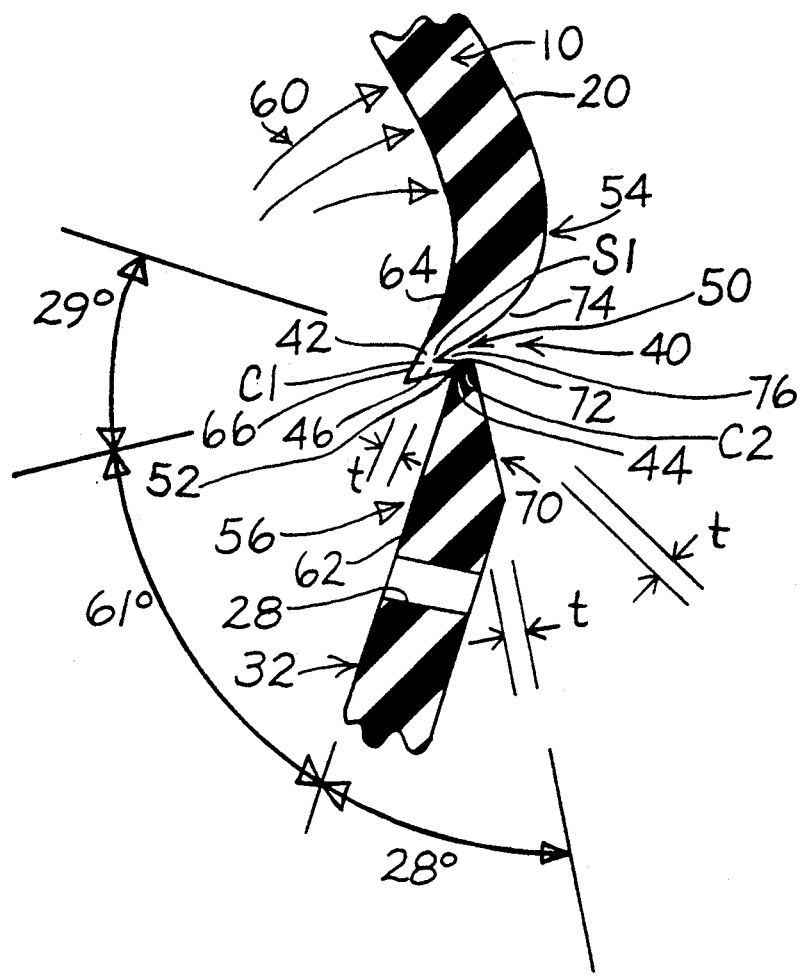
FIG. 3 illustrates an exploded view of a portion of the cover showing in greater detail a seam formed therein.

Reference is made to the exploded view of FIG. 3. This figure illustrates the cover 10 in its normal, unstressed condition corresponding to that shown in FIG. 2. In the preferred embodiment of the invention the single tearable seam 40 extends across the entire front of the cover 10 selectively joining the top panel 20 to the side 32. It is not necessary that a single seam be used to attach the entire top portion 32 to a single side piece. Alternatively, the top portion 20 can be attached to the side 32 by a plurality of tabs (not shown) with each tab including a tear seam 40 of the contruction described below.

As can be seen from FIG. 3, the seam 40 is formed in the cover 10 by utilizing two narrow thickness portions 42 and 44 of cover material joined by a thin bridge-like region 46 of cover material. These narrowed thickness portions define regions of enhanced stress. In a general sense the seam 40 may also be viewed of as comprising a first axially extending groove 50, the thin bridge of cover material 46 and a spaced second axially extending groove 52. As will be seen from the discussion below, the contruction of the seam 40 will yield a plurality of zones of increased tensile and compressive stresses (S1, S2, C1, C2).

In the following description the words forward, front, rear, and rearward are used to describe various features of the door 10 and seam 40. In this description forward or front means facing the occupant and rear or rearward is to be interpreted as away from the occupant and not directions related to the front or rear of the vehicle. As can be seen in FIG. 3 the first groove 50 is formed on the forward facing surface 54 of the cover 10 and the second groove 52 is formed generally on the rearward facing surface 56 of the cover 10 and spaced somewhat below the first groove 50. With this construction and upon expansion of the air bag generally shown by the arrows 60, a force will be exerted on the cover 10 which will create various stresses within the seam 40.

In the construction of the seam 40 shown in FIG. 3, the grooves 50 and 52 are shown having sharp inner edges. This is not a requirement of the invention in that one or both of these grooves may be somewhat tapered or curved. The cover 10, in the vicinity of the seam 40, may include a first rear surface 62 and a generally parallel spaced second rear surface 64. A rear transition surface 66 (which is the lower surface of the bridge) joins the first and second rear surfaces. On the forward facing side of the cover 10 is a first front surface 70 spaced from the first rear surface 62. A first transition surface 72, extends from the first front surface 70 toward the second rear surface 64 and a second transition surface 74 extends forwardly from proximate the inner edge 76 of the first transition surface 72. In the preferred embodiment of the invention, the angular spacing between the first rear surface 62 and the rear transition surface 66, generally proximate their line of intersection, is approximately 60 to 61 degrees. In addition, the angular spacing between the first rear surface 64 and the first front surface 70, is approximately 20 to 29 degrees. In addition, the angular spacing between the rear transition surface 66 and the first transition surface 72 is again approximately 28 to 29 degrees. As can be seen from FIG. 3, the orientation of the various surfaces provides for the above mentioned plurality of reduced thickness portions 42 and 44 of the cover 10. These reduced thickness portions of the cover 10 are generally shown as (t). In the preferred embodiment the thickness of material in these critical sections is approximately 0.5 mm.

The seam 40 has been designed to stress the material forming the cover to its ultimate elongation to initiate a cracking or rupturing along a portion of the seam 40 and thereafter providing for rapid crack propogation along the length of the seam as a result of increased but relatively low tensile forces. Implicit in the design of the seam 40 is that the air bag need only generate a modest amount of force on the top panel 20, therefore less inflation energy is used to open or sever the cover and more energy is available to inflate the air bag resulting in a more rapid deployment. As previously mentioned by utilizing this type of seam which opens at a low energy level provides greater flexibility in the design of the hinge 26. More specifically, the seam 40 has been designed to provide a first zone of increased tensile forces in the vicinity of the inner edge 76 shown generally as S1. In addition, a zone of increased compressive stress, shown as C1, is created in the rear surface 64. A second zone of increased tensile stress S2, is created along the intersection of the rear transition surface 66 and rear surface 64 while a second zone of increased compressive forces C2, is created generally about the intersection of the front surface 70 and the transition surface 72.

Figure 4:
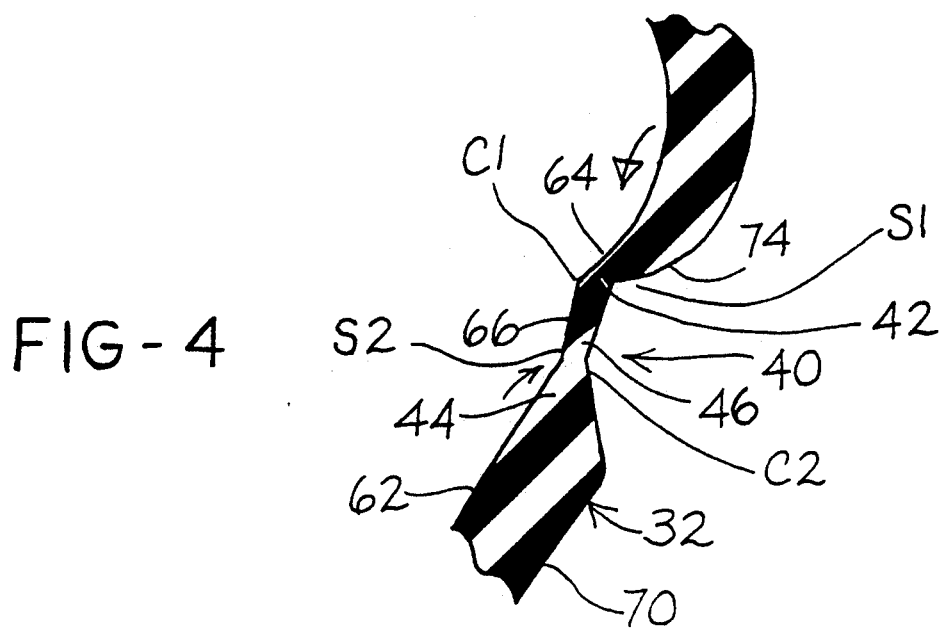
FIG. 4 illustrates such seam in a stretched or tensioned condition.

Reference is made to FIG. 4 which illustrates the seam 40 in its stressed condition. As mentioned above, the front side 32 is adapted to be attached to the 30 instrument panel or other structure forming the support for the instrument panel or some other rigid object. Upon the initial inflation of the air bag, the inflation forces acting along arrows 60 cause the panel 20 to move outwardly. As the panel 20 or cover 10 move outwardly the bridge 46 will begin to rotate relative to the narrowed portions 42 and 44 (i.e. lower groove 52 and upper groove 50). As can be seen the bridge 46 rotates clockwise relative to the lower groove 52 and counterclockwise relative to the upper groove 50. These movements stretch the material in zone S2 and compress the relatively rigid material on the forward portion of the cover generally in the vicinity of zone C2. In addition, these relative movements generate increased tensile forces proximate zone S1 and generate the increased compressive stresses forces generally within zone C1. During the expansion of the air bag, the material within the zones S1 and S2 will also be stretched to the ultimate elongation of the material. The ultimate elongation of Nylon 6 is approximately 200% and its flexural modulus of about 240K psi.

Having so stressed the seam 40 as described above and stretched the material to its ultimate elongation, the seam will begin to open generally in one of the zones of increased tensile stress. As the air bag continues to press against the top panel 20, this opening will expand and propogate rapidly across the entire length of the seam 40 thereby separating the cover 20 from the side 32 and permitting same to fully open as it rotates about its rear hinge 26 thereby permitting the full deployment of the air bag 34.

While a polyamide or polycaprolactam such as Nylon 6 appears to be the material of choice, the cover 10 can be constructed of a more compliant material such as a thermoplastic. The ultimate elongation for thermoplastics is in the range of approximately 500%. A thermoplastic cover should exhibit similar, enhanced crack propagation.

Many changes and modifications in the above described embodiment of the invention can, of course, be carried out without departing from the scope thereof. Accordingly, that scope is intended to be limited only by the scope of the appended claims.

We claim:

1. A cover (10) of integral construction for an air bag comprising:
   a panel (20); hinge means (26) formed adjacent a first side (28) of the panel for enabling the panel to rotate thereabout after the panel separates from a seam means in response to forces imparted thereto by an expanding air bag,
   the seam means (40), interposing an opposite side (32) of the panel, for providing a tear or crack region to permit the panel to separate at the opposite side (32), comprising stress enhancing means for increasing stresses including
   a narrow first portion (42), a closely spaced narrow second portion (44) and a thin bridge (46) joining the first and second portions (42,44) formed in material forming the seam means, the first portion, second portion and bridge are relatively rotatably movable one to the other so as to generate in the material at least two zones of increased tensile stress a first zone of increased tensile stress generally between the first portion (42) and the thin bridge (46) and a second zone of increased tensile stress generally between the second portion and the thin bridge (46) and a zone of compressive stress, on an opposite side of the first and second portion generally opposite each zone of increased tensile stress.

2. The cover (10) as defined in claim 1 wherein in response to inflation forces imparted by the air bag the cover (10) is placed in a stressed condition, causing the relative rotation of the first portion (42), bridge (46) and second portion (44) thereby stretching the material forming the seam means to its ultimate elongation to produce the zones of increased tensile stress, causing such material to initially tear or crack and in response to the continued inflation of the air bag to cause the crack to propogate, severing the panel (20) at the opposite side (32).

3. A cover (10) of integral construction for an air bag comprising:
   a panel (20); hinge means (26) formed adjacent a first side (28) of the panel for enabling the panel to rotate thereabout after the panel separates from a seam means in response to forces imparted thereto by an expanding air bar,
   the seam means (40), interposing an opposite side (32) of the panel, for providing a tear or crack region to permit the panel to separate at the opposite side (32), comprising stress enhancing means for increasing stresses including
   a narrow first portion (42), a closely spaced narrow second portion (44) and a thin bridge (46) joining the first and second portions (42,44) formed in material forming the seam means, the first portion, second portion and bridge are relatively rotatably movable one to the other so as to generate in the material at least two zones of increased tensile stress, the first zone generally between the first portion (42) and the thin bridge (46) and a second zone generally between the second portion and the thin bridge (46) wherein in response to inflation fores imparted by the air bag the seam means is placed in a condition of increased stress stretching the first portion, bridge and second portion apart and causing the first portion and bridge to rotate relative to one another and the second portion and bridge to rotate relative to one another to generate the first and second zones of increased tensile stress.

4. A cover (10) of integral construction for an air bag comprising:
   a panel (20); hinge means (26) formed adjacent a first side (28) of the panel for enabling the panel to rotate thereabout after the panel separates from a seam means in response to forces imparted thereto by an expanding air bag,
   the seam means (40), interposing an opposite side (32) of the panel, for providing a tear or crack region to permit the panel to separate at the opposite side (32), comprising stress enhancing means for increasing stresses including
   a narrow first portion (42), a closely spaced narrow second portion (44) and a thin bridge (46) joining the first and second portions (42,44) formed in material forming the seam means, the first portion, second portion and bridge are relatively rotatably movable one to the other so as to generate in the material at least two zones of increased tensile stress, the first zone generally between the first portion (42) and the thin bridge (46) and a second zone generally between the second portion (44) and the thin bridge (46), wherein in response to inflation forces imparted by the air bag the cover (10) is placed in a stressed condition, causing the relative rotation of the first portion (42), bridge (46) and second portion (44) thereby stretching the material forming the seam means to its ultimate elongation to produce the zones of increased tensile stress, causing such material to initially separate or crack and in response to the continued inflation of the air bag to cause the crack to propagate, severing the panel (20) from the opposite side (32) wherein a zone of compressive stress is generated generally opposite each zone of increased tensile stress in portions of the material compressed in response to the relative rotation of the first portion, second portion and bridge.

5. The cover as defined in claim 4 wherein the cover is mounted on the top of an instrument panel proximate a windshield of a vehicle such that the cover is subject to sun loanding and wherein the material defining the cover exhibits a flexural modulus of approximately 240K psi such that the structural properties of the cover are not substantially reduced due to increased temperatures arising at the sun loading.

6. The cover as defined in claim 4 wherein the ultimate elongation of the material is between 200 percent and 500 percent.

7. The cover as defined in claim 4 wherein at least one of the first and second portions (42,44) comprises a sharp edged groove.

8. The cover as defined in claim 4 wherein the first and second portions includes a sharp edged groove, wherein the interior portion of each groove is oppositely oriented.

9. The cover as defined in claim 8 wherein the material is stretched to its ultimate elongation in the vicinity of the interior of at least one of the grooves.

10. A cover (10) for an air bag (34) comprising:
    a panel (20) and an integrally formed seam means (40) along one side of the panel;
    the seam means comprising:
    a first rear surface (62) and a parallel spaced second rear surface (64), a rear transition surface (66) joining the first rear and second rear surfaces, a first front surface (70) spaced from the first rear surface and rear transition surface, a first front transition surface (72) extending from the first front surface (70) toward the second rear surface (64) and a second front transition surface (74) extending forwardly from generally proximate an inner edge (76) of the first front transition surface (72), wherein as the air bag expands it exerts an expansion force on the cover which tends to stretch the material forming the seam means (40) such that a first zone of increased tensile stress is created in the vicinity of the inner edge (76) of the first front transition surface (72) and wherein a first zone of increased compressive stress is created generally in the second rear surface (64) and wherein a second zone of increased tensile stress is created along the intersection of the rear transition surface (66) and first rear surface (62) and a second zone of increased compressive stress is created generally about the intersection of the first front surface (70) and first front transition surface (72), such increased tensile and compressive stresses cooperating to cause the material forming the seam means to stretch to its ultimate elongation and tear thereby separating the panel from the seam means.

11. The cover as defined in claim 10 wherein the vicinity of the intersection of the rear transition (66) and first rear surface (70) the first front surface (62) is generally angularly spaced from the rear transition surface by approximately 90 degrees.

12. The cover as defined in claim 11 wherein the angular spacing is 89 degrees.

13. The cover as defined in claim 10 wherein in the vicinity of the intersection of the rear transition (66) and first rear surface (62) the first rear surface (62) is generally angularly spaced from the rear transition surface by approximately 60 degrees.

14. The cover as defined in claim 13 wherein the angular spacing is 61 degrees.

15. The cover as defined in claim 13 wherein in the first front transition surface extends inwardly at an angle relative to the first rear surface of approximately 90 degrees.

16. The cover as defined in claim 15 wherein an intersection line (76) between the first and second transition surfaces is closely spaced from the second rear surface (64) to generate a zone of increased tensile stress as the seam means is expanded.

17. The cover as defined in claim 16 wherein the spacing is approximately 0.5 mm.

18. The cover as defined in claim 16 wherein the distance from the first front transition surface (72) to the intersection of the first rear surface (62) and rear transition surface (66) is spaced to generate a second zone of increased tensile stresses as the seam means is expanded.

19. The cover as defined in claim 18 wherein the distance is approximately 0.5 mm.

* * * * *